(12) United States Patent
Santarcangelo (10) Patent No.: US 12,222,065 B1
(45) Date of Patent: Feb. 11, 2025

(54) DETACHABLE STORAGE SYSTEM

(71) Applicant: Timothy Santarcangelo, Bridgewater, MA (US)

(72) Inventor: Timothy Santarcangelo, Bridgewater, MA (US)

( * ) Notice: Subject to any disclaimer, the term of this patent is extended or adjusted under 35 U.S.C. 154(b) by 0 days.

(21) Appl. No.: 18/354,322

(22) Filed: Jul. 18, 2023

(51) Int. Cl.
*F16M 13/02* (2006.01)
*F16B 2/08* (2006.01)
*F16B 45/00* (2006.01)

(52) U.S. Cl.
CPC .............. *F16M 13/02* (2013.01); *F16B 2/08* (2013.01); *F16B 45/005* (2021.05); *F16M 13/022* (2013.01)

(58) Field of Classification Search
CPC ........... A45F 5/02; A47G 7/045; A47G 7/044; A47G 25/08; A47G 25/0614; F16M 13/02; F16M 13/022; F16B 45/012; F16B 45/005; F16B 2/08; A47F 5/0823
USPC ......... 211/106, 106.01; 248/302, 303, 230.8, 248/228.8, 218.4
See application file for complete search history.

(56) References Cited

U.S. PATENT DOCUMENTS

| | | | |
|---|---|---|---|
| 409,239 A | 8/1889 | Roller | |
| 753,446 A | 3/1904 | Swartwout | |
| 808,142 A * | 12/1905 | Danhour | A47K 1/09 |
| | | | 248/302 |
| 873,488 A * | 12/1907 | DeBeaumont et al. | |
| | | | D06F 53/04 |
| | | | 452/187 |
| 901,652 A * | 10/1908 | Seydel | F16M 13/02 |
| | | | 248/230.8 |
| 1,331,525 A | 2/1920 | Pratt | |
| 1,417,215 A * | 5/1922 | Syrett | F24D 19/0082 |
| | | | 248/905 |
| 3,164,343 A * | 1/1965 | Cucullo | A47G 7/044 |
| | | | 248/27.8 |
| 3,200,960 A * | 8/1965 | Banse | A47F 5/0807 |
| | | | 312/328 |
| 3,357,294 A * | 12/1967 | Taylor | F16B 21/071 |
| | | | 403/247 |
| 3,678,886 A * | 7/1972 | Tibbet | G09F 17/00 |
| | | | 248/230.8 |

(Continued)

FOREIGN PATENT DOCUMENTS

| | | | | |
|---|---|---|---|---|
| DE | 202004013843 U1 * | 1/2005 | ........... | A47F 5/0006 |
| DE | 102017008958 A1 | 3/2019 | | |

(Continued)

*Primary Examiner* — Taylor Morris
(74) *Attorney, Agent, or Firm* — LUCAS & MERCANTI, LLP (57) ABSTRACT

A detachable storage system for hanging an object from a non-planar structure is described. The storage system includes an elastic anchoring device further including (i) spaced elastic bands extending along a longitudinal axis, each of the spaced elastic bands having opposite first and second ends, (ii) a connecting means configured to tension the opposite first and second ends towards each other thereby securing the elastic anchoring device to the non-planar structure, and (iii) a plurality of spaced poles fixed to and extending between the spaced elastic bands. The storage system further includes at least one metal hook configured to attach to and detach from the plurality of spaced poles, the at least one hook providing a section for hanging the object from the non-planar structure.

19 Claims, 5 Drawing Sheets

(56) References Cited

U.S. PATENT DOCUMENTS

| | | | | |
|---|---|---|---|---|
| 3,682,426 A | * | 8/1972 | Owen | A47G 23/0225 |
| | | | | 248/222.12 |
| 4,269,381 A | * | 5/1981 | Harms | A47B 5/02 |
| | | | | 248/302 |
| 4,629,074 A | | 12/1986 | Toder | |
| 4,724,967 A | * | 2/1988 | Valiulis | A47F 5/0807 |
| | | | | 211/106 |
| 4,744,537 A | * | 5/1988 | Buckley | F16M 13/022 |
| | | | | 248/219.4 |
| 4,809,894 A | * | 3/1989 | Viio | A45F 5/02 |
| | | | | 248/302 |
| 4,942,989 A | * | 7/1990 | Miller | B60R 9/02 |
| | | | | 224/325 |
| 4,953,819 A | | 9/1990 | Davis | |
| 5,054,728 A | * | 10/1991 | Nigro, Jr. | A47F 5/0823 |
| | | | | 248/302 |
| 5,090,397 A | * | 2/1992 | Larsen | E02D 9/00 |
| | | | | 182/187 |
| 5,310,151 A | * | 5/1994 | Engel | F21V 21/08 |
| | | | | 248/230.8 |
| 5,427,344 A | * | 6/1995 | Beauchemin | A44B 11/125 |
| | | | | 182/187 |
| 5,556,068 A | * | 9/1996 | Gorelik | B25H 3/04 |
| | | | | 248/302 |
| 6,708,832 B1 | * | 3/2004 | Hannon | A47G 7/045 |
| | | | | 182/187 |
| 7,475,859 B2 | | 1/2009 | Selders | |
| 7,798,463 B2 | | 9/2010 | Morgenroth | |
| 8,387,939 B2 | * | 3/2013 | Ford | F16M 13/02 |
| | | | | 362/474 |
| 8,733,720 B2 | * | 5/2014 | Wilkinson | G09F 17/00 |
| | | | | 248/230.1 |
| 10,492,631 B2 | | 12/2019 | Velderman et al. | |
| 10,568,442 B2 | | 2/2020 | Thrush | |
| 11,178,964 B2 | | 11/2021 | Buck et al. | |
| 2005/0061934 A1 | * | 3/2005 | Steven | F16M 13/022 |
| | | | | 248/230.8 |
| 2006/0049124 A1 | * | 3/2006 | Wang | A47B 43/003 |
| | | | | 211/113 |
| 2015/0034572 A1 | | 2/2015 | Kao | |
| 2016/0258455 A1 | * | 9/2016 | Chang | F16B 2/08 |
| 2018/0244447 A1 | * | 8/2018 | Chmelar | B65D 63/1027 |

FOREIGN PATENT DOCUMENTS

| | | | | |
|---|---|---|---|---|
| DE | 202021003788 U1 | * | 3/2022 | E06C 7/48 |
| GB | 2113519 A | * | 8/1983 | A01K 5/01 |
| GB | 2445173 A | * | 7/2008 | F16M 11/10 |
| KR | 200452827 Y1 | * | 3/2011 | F16B 2/08 |
| KR | 102428877 B1 | | 8/2022 | |
| WO | 2017078840 A1 | | 5/2017 | |

* cited by examiner

DETACHABLE STORAGE SYSTEM

FIELD OF THE INVENTION

The present invention is directed to a detachable storage system for hanging items, and more particularly, for hanging items on non-planar structures such as columns.

BACKGROUND OF THE INVENTION

The storage of items is a common problem facing both commercial and residential establishments. One common solution for the lack of storage is to hang items on walls using some type of device ranging from a single nail to a multi-track system equipped with a plurality of hooks. An example of such a multi-track system is found in U.S. Pat. No. 7,798,463, which describes an adjustable hanging system for securing an object to a wall (i.e., a planar structure). However, such a storage system cannot be fixed to non-planar surfaces such as columns. Likewise, the storage system is not readily detachable since the anchoring device is fixed to the wall via a plurality of nails or equivalents fasteners. The use of nails or fasteners also damages the structure to which the anchoring device is fastened.

In view of the above, there is a need for a storage system that can be attached to non-planar structures such as columns or poles. There is also need for a storage system that is readily detachable allowing the system to be easily moved from one non-planar structure to another non-planar structure to provide alternate locations for storage. There is also a need for a non-destructive storage system that does not damage the structure from which items are hung.

SUMMARY OF THE INVENTION

In view of the above needs, the present invention provide a solution for hanging items from non-planar structures such as columns and poles. The present invention also provides a solution for a storage system that is detachable allowing the storage system to be easily moved from one non-planar structure to another non-planar structure. Lastly, the present invention provides a solution for a storage system that does not damage the structure to which the storage system is anchored.

In one embodiment, the detachable storage system for hanging an object from a non-planar structure includes: an elastic anchoring device including (i) spaced elastic bands extending along a longitudinal axis, each of the spaced elastic bands having opposite first and second ends, (ii) a connecting means configured to tension the opposite first and second ends towards each other thereby securing the elastic anchoring device to the non-planar structure, and (iii) a plurality of spaced poles fixed to and extending between the spaced elastic bands; and at least one metal hook configured to attach to and detach from the plurality of spaced poles, the at least one hook providing a section for hanging the object from the non-planar structure. In a further embodiment, the plurality of spaced poles and the at least one hook are formed from metal.

The elastic anchoring device has the spaced elastic bands are substantially parallel extending along the longitudinal direction. The elastic anchoring device also has the plurality of spaced poles extending substantially orthogonal between the spaced elastic bands. In an embodiment, the spaced elastic bands are formed from an elastomeric polymer.

In another embodiment, the at least one hook is formed from a pair of spaced, elongated members extending along a longitudinal axis. The spaced elongated members converge to form an apex portion at one end of the at least one hook and terminate at first and second ends opposite from the apex portion along the longitudinal axis. The first and second ends of the at least one hook are configured to attach to and detach from the plurality of poles of the elastic anchoring device. In a further embodiment, the apex portion extends at an angle away from the longitudinal direction of the spaced, elongated members. For example, the angle of the apex portion can be substantially orthogonal relative to the longitudinal direction of the spaced, elongated members. Likewise, the apex portion of the hook can be a U-shaped portion.

In another embodiment, the first and second ends of the at least one hook each have an arcuate portion configured to attach and detach from the plurality of poles of the elastic anchoring device. The arcuate portions of the first and second ends can each be an L-shaped element. In a further embodiment, a majority of each L-shaped element extends along the longitudinal axis of the spaced, elongated members, and a minority of each L-shaped element extends at an angle substantially orthogonal to the longitudinal axis of the spaced, elongated members.

In accordance with an embodiment of the invention, each of the pair of spaced, elongated members of the at least one hook can have an abutting portion that is distal from the apex portion and that is proximal to the first and second ends. The abutting portion can be further configured to abut one of the spaced elastic bands of elastic anchoring device after the first and second ends are attached to the plurality of poles of the elastic anchoring device. In a further embodiment, the abutting portion of each spaced, elongated member can extend at an angle away from the longitudinal direction of the spaced, elongated members. In another embodiment, the angle of the abutting portion is substantially orthogonal relative to the longitudinal direction of the spaced, elongated members.

In another embodiment, the connecting means of the elastic anchoring device can be at least one metal arm having opposing ends, where one of the opposing ends is configured to attach to and detach from the plurality of poles of the elastic anchoring device. For example, the opposing end configured to attach and detach from the plurality of poles is an arcuate portion configured to hook one of the plurality of poles. In a further embodiment, the at least one arm is a pair of metals arms with opposing ends. In another embodiment, the other end of the at least one arm is rotatably fixed to one of the plurality of poles of the elastic anchoring device.

DETAILED DESCRIPTION OF THE INVENTION

In view of the above-noted needs for storage solutions, the present invention provides detachable storage system for hanging items from non-planar structures. In the context of the present invention, non-planar structures means non-flat structures such as columns and poles unlike conventional storage devices used to hang items from planar structures such as walls. However, in the context of the present invention, non-planar structures does not exclude non-planar structures that incorporate planar surfaces. For example, a column formed from multiple planar surfaces fixed to each other at an acute angle is a non-planar structure in accordance with the invention.

Figure 1:
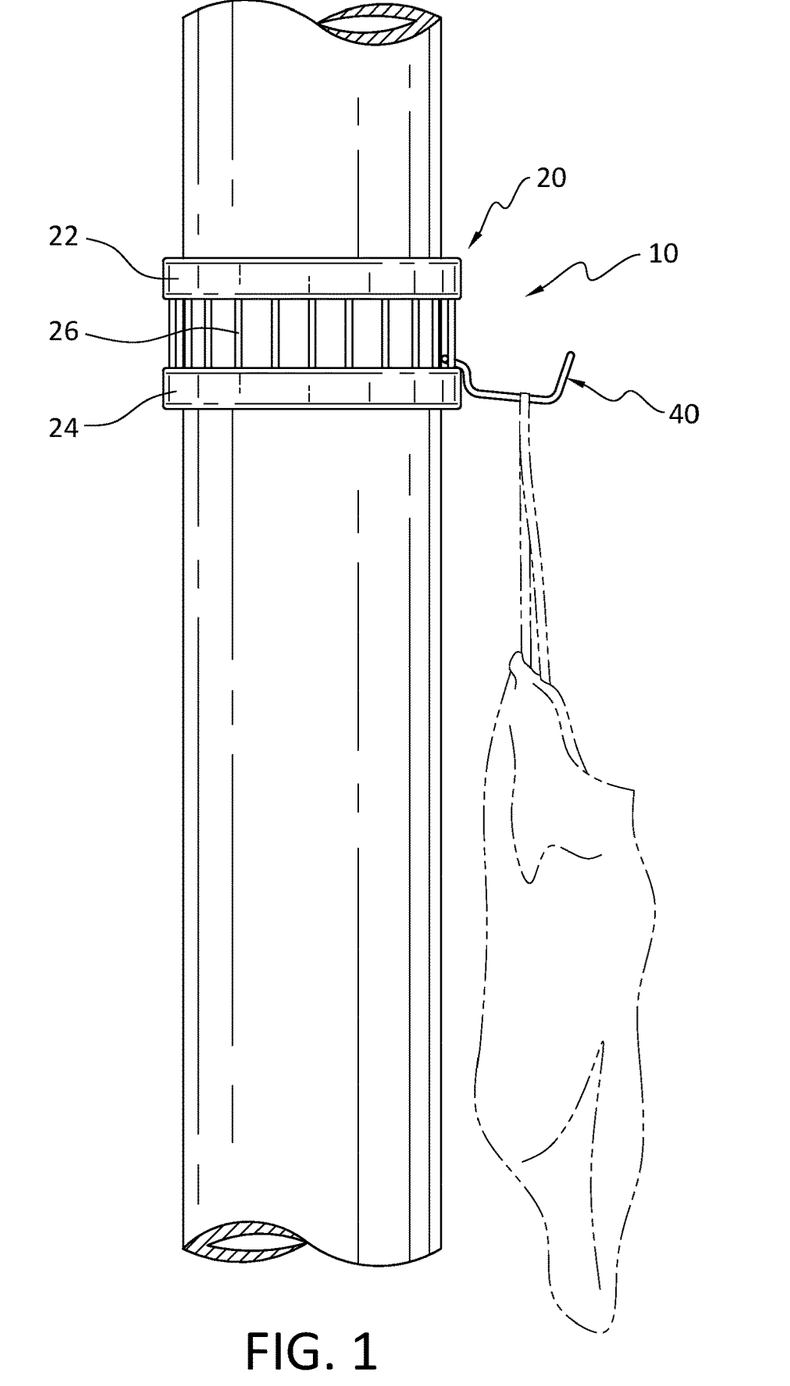
FIG. 1 is a side view of the detachable hanging system 10, with an elastic anchoring device 20 and at least one hook 40, fully implemented (i.e., secured) on a non-planar structure.

Turning to figures, FIG. 1 shows a side view of detachable hanging system 10 being fully implemented to store an item from a non-planar structure. As shown in FIG. 1, elastic anchoring device 20, formed from spaced elastic bands 22, 24, is secured to a pole (not labelled) by effectively being wrapped around the pole so that the inner surface (not labelled) of spaced elastic bands 22, 24 of elastic anchoring device 20 abuts the exterior surface of the pole (not labelled) in a constricting manner. As further shown in FIG. 1, at least one hook 40 is attached to (i.e., locked into) elastic anchoring device 20 by at least one hook 40 being attached to a pair of a plurality of spaced poles 26 fix to and extending between spaced elastic bands 22, 24. In the embodiment shown in FIG. 1, the plurality of poles 26 extend in a substantially orthogonal direction between spaced elastic bands 22, 24. As further show in FIG. 1 below, at least one hook 40 is configured to extend away at an angle (e.g., substantially orthogonal) from elastic anchoring device 20 once at least one hook 40 is attached to (i.e., locked into) plurality of poles 26 of elastic anchoring device 20. The resulting configuration provides a section of at least one hook 40 from which an item to be stored is hung (not labelled) from at least on hook 40.

Figure 2:
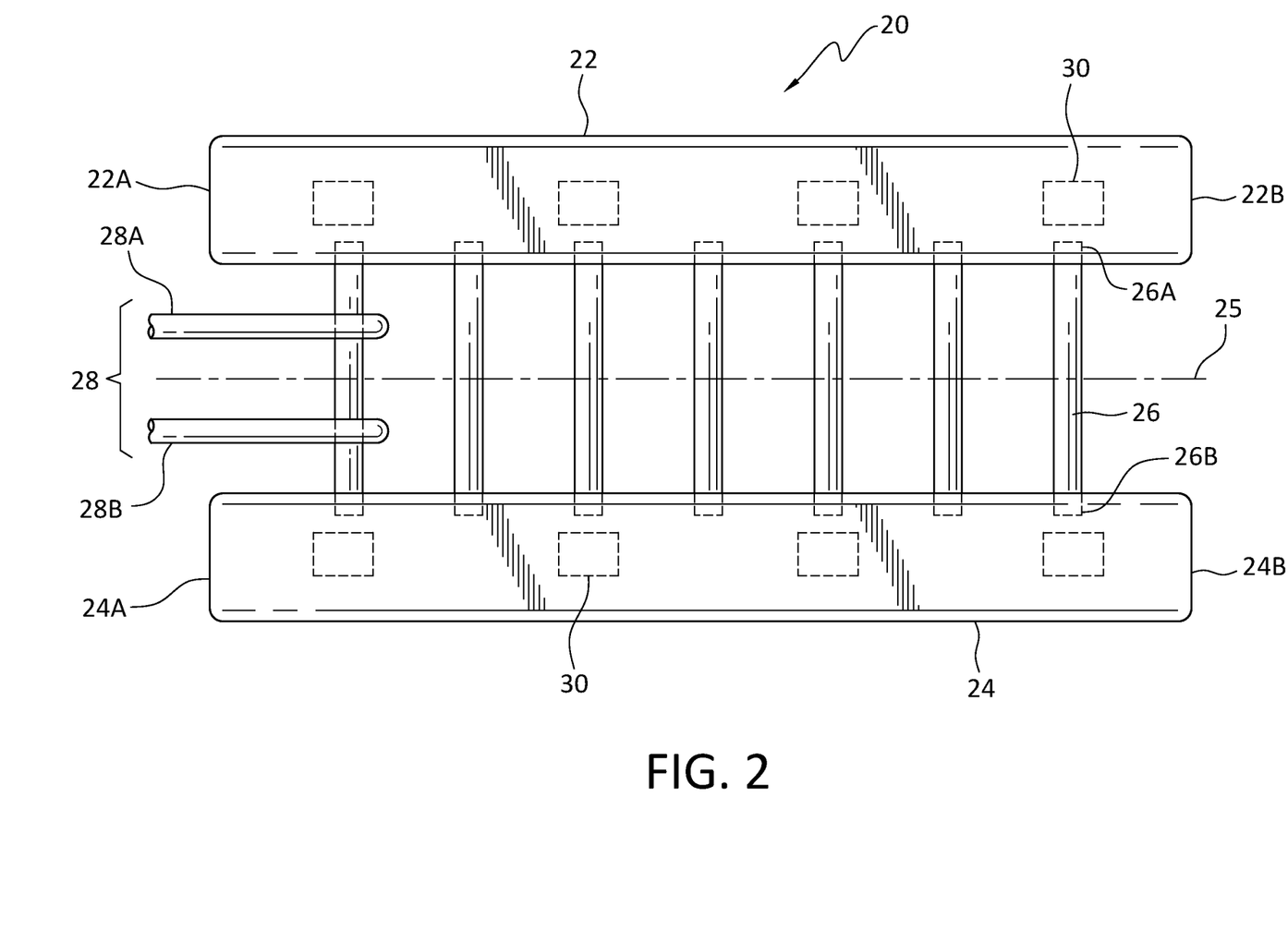
FIG. 2 is a top plan view of the elastic anchoring device 20 of the detachable hanging system 10.

FIG. 2 provides a more detailed view of elastic anchoring device 20 of the present invention. FIG. 2, which is a top planar view, shows elastic anchoring device 20 includes a pair of spaced elastic bands 22, 24 extending along longitudinal direction 25. In the embodiment shown in FIG. 2, spaced elastic bands 22, 24 extend along longitudinal direction 25 in a substantially parallel manner. Spaced elastic bands 22, 24 each have opposing ends 22A, 22B and 24A, 24B, respectively. Spaced elastic bands 22, 24 are adapted with a plurality of spaced poles 26 extending between and are fixed to spaced elastic bands 22, 24. In shown embodiments, spaced poles 26 extend between in spaced elastic bands 22, 24 in a substantially orthogonal angle especially when seen relative to longitudinal direction 25.

As further shown in FIG. 2, each of the plurality of spaced poles 26 have first and second ends 26A, 26B disposed (i.e., anchored) in the opposing inner sides (not labelled) of spaced elastic bands 22, 24. This can be achieved in several ways. For example, spaced elastic bands 22, 24 are preferably formed from an elastomeric polymer such as thermoplastic or thermoset elastomer such as vulcanized rubber. Spaced poles 26 can be disposed in the opposing inner sides during the molding of spaced elastic bands 22, 24 from the elastomeric polymer. In another embodiment, spaced elastic poles 22, 24 are first molded. Once the elastomeric polymer has set, a plurality of holes can then be drilled into the opposing inner sides (not labelled) of spaced elastic bands 22, 24. Once drilled, first and second ends 26A, 26B of spaced poles 26 are inserted into the drilled holes. In a further embodiment, an adhesive can be applied to first and second ends 26A, 26B prior to insertion. The adhesive will provide additional anchoring of spaced poles 26 into spaced elastic bands 22, 24.

In accordance with the invention, opposing first and second ends 22A, 22B of elastic band 22 and opposing first and second ends 24A, 24B of elastic band 22 are stretched towards each other during installation of elastic anchoring device 20 on a non-planar structure. As a result, opposing ends 22A, 22B of elastic band 22 and opposing ends 24A, 24B of elastic band 24 are placed under tension while the inner surfaces of spaced elastic bands 22, 24 abut the surface of the non-planar structure in a constricting manner as shown in FIG. 1. FIG. 2 shows a partial view of connecting means 28 attached to one of the spaced poles 26. In accordance with the invention, connecting means 28 is configured to tension the opposite first and second ends towards each other thereby securing the elastic anchoring device to the non-planar structure. In the embodiment shown in FIG. 2, connecting means 28 is configured to tension the opposite first and second ends (22A, 22B of elastic band 22 and 24A, 24B of elastic band 24) towards each other thereby securing elastic anchoring device 20 to the non-planar structure.

As shown in FIG. 2, connecting means 28 can comprise a pair of metal arms 28A, 28B have opposite ends (not labelled) where one of the opposing ends of each metal arm is configured to attach and detach from the plurality of poles 26 of the elastic anchoring device 20. This can be achieved by an opposing end being formed into an arcuate (i.e., angled) portion configured to hook one of the plurality of poles 26. However, one skilled in the art will appreciate that connecting means 28 can easily comprise a single metal arm. While not shown in FIG. 2, the other set of opposing ends of metal arms 28A, 28B can also be configured to attach and detach from the plurality of poles 26 of the elastic anchoring device 20. In another embodiment of the invention, the other set of opposing ends of metal arms 28A, 28B can also be rotatably fixed to one of the plurality of poles of the elastic anchoring device. This can be achieved by making an arcuate portion at one of the ends of metal arms 28A, 28B captive to one of the plurality of poles 26. For example, one set of opposing ends of metal arms 28A, 28B can be bent to form an eyelet where the respective arm is rotatably fixed to the plurality of poles 26. Thus, in accordance with the invention, metals arms 28A, 28B can be configured to (i) have both sets of opposing ends configured to attach and detach from the plurality of poles 26 of elastic anchoring device 20, or (ii) have one set of opposing ends configured to attach and detach from the plurality of poles 26 of elastic anchoring device 20, while the other set of opposing ends is rotatably fixed to the plurality of poles 26 of elastic anchoring device 20.

Lastly, FIG. 2 shows that spaced elastic bands 22, 24 can be provided with a plurality of magnets 30 along the length of spaced elastic bands 22, 24. Magnets 30 can provide greater anchoring of elastic anchoring device 20 to a non-planar structure containing a ferrous metal (e.g., a pole formed from carbon steel). In the embodiment shown in FIG. 2, magnets 30 are embedded within spaced elastic bands 22, 24 along the length of the bands. Embedding of magnets 30 can be achieved during the molding spaced elastic bands 22, 24 from the elastomeric polymer.

Figures 3, 4:
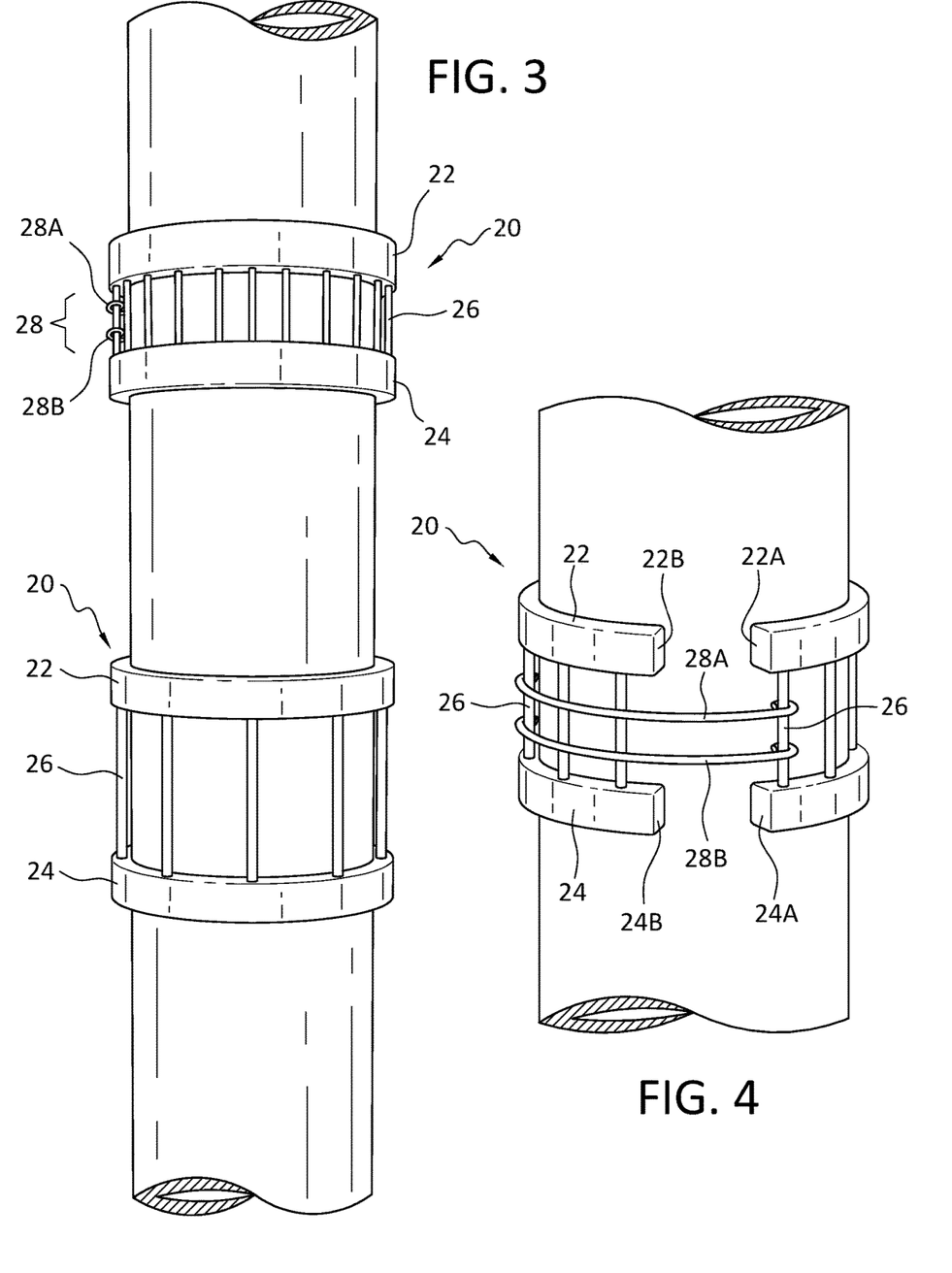
FIG. 3 is a side view of dual elastic anchoring devices 20 secured to a non-planar structure.
FIG. 4 is a rear view of the elastic anchoring device 20 with a connecting means tensioning opposite ends of the elastic anchoring device allowing the elastic anchoring device to be secured to the non-planar structure.

FIG. 3 shows a pole (i.e., a non-planar structure) equipped with a pair of (i.e., dual) elastic anchoring devices 20 in accordance with the invention. As can be seen from FIG. 3, the width of elastic anchoring device 20 is variable (as seen in the vertical direction). This is achieved by varying the length of plurality of poles 26 used for each elastic anchoring device 20.

FIG. 4 shows a rear view of elastic anchoring device 20 with connecting means 28 used to secure (i.e., anchor) elastic anchoring device 20 to a pole (i.e., a non-planar structure). In accordance with the invention, spaced elastic bands 22, 24 of elastic anchoring device 20 are stretched around the non-planar structure thereby pulling towards each other first and seconds ends 22A, 22B of elastic band 22 and first and second ends 24A, 24B of elastic band 24. Tension is maintained by connecting means 28. Connecting means 28 is shown as pair of metal arms 28A, 28B with opposing ends being formed into arcuate (i.e., angled) portions (not labelled) to secure an opposing pair of the plurality poles 26 to each other. As further shown in FIG. 4, going from left to right, the left side arcuate ends of metals arms 28A, 28B (not labelled) are configured to being configured to attach to and detach from the plurality of poles 26 of elastic anchoring device 20. This is achieved by left side arcuate ends being formed in hooks to allow attachment and detachment from the plurality of poles 26. In the embodiment shown in FIG. 4, the right side arcuate ends of metal 28A, 28B (not labelled) are rotatably fixed to one of the plurality of poles 26 of elastic anchoring device 20. Stated otherwise, the right side arcuate ends are captive to one of the plurality of poles 26 (i.e., not detachable) but can rotate around the longitudinal axis of pole 26. This is achieved by right arcuate ends being formed into eyelets rather than hooks found on the left side of metal arms 28A, 28B. As a result, connecting means 28 remains partially attached to the plurality of poles 26 when elastic anchoring device 20 is detached (i.e., removed) from a non-planar structure.

One skilled in the art will appreciate that various modifications and other structures can be used for connecting means 28. For example, both ends of metals arms 28A, 28B can be formed as hooks to allow connecting means 28 to be fully detachable from the plurality of poles 26 of elastic anchoring device. In another embodiment (not shown), connecting means 28 can be a ratcheting mechanism as typically found in ratcheting straps. The ratcheting mechanism is connected to opposing poles 26 whereby first and second ends of spaced elastic bands 22, 24 (i.e., 22A, 22B and 24A, 24B, respectively) are pulled toward each other and maintain tension on spaced elastic bands 22, 24.

Figure 5:
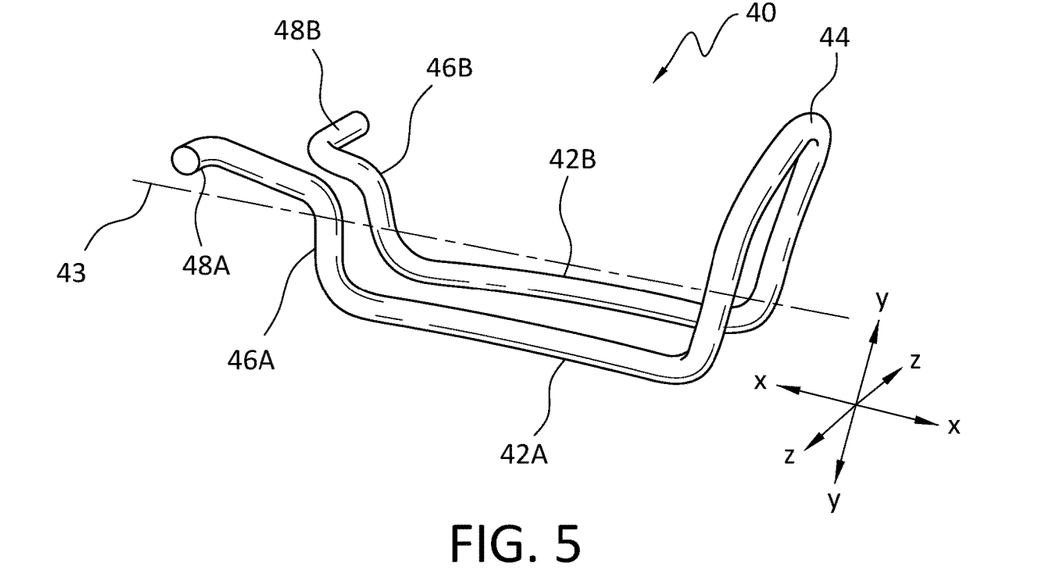
FIG. 5 is a perspective view of at least one hook 40, from back to front, configured to attach and detach from elastic anchoring device 20.
Figure 6:
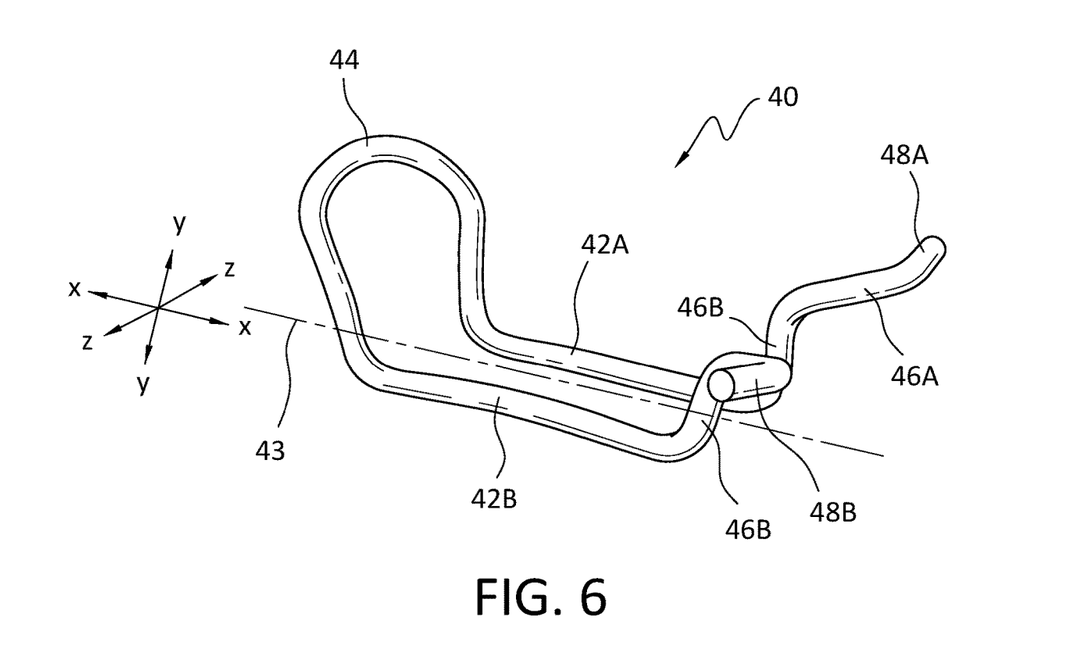
FIG. 6 is a perspective view of at least one hook 40, from front to back, configured to attach and detach from elastic anchoring device 20.

FIGS. 5 and 6 show perspective views of at least one hook 40 from front to back, and back to front, respectively. In the context of the present invention, "at least one hook" means "one or more hooks" since multiple items may be hung with detachable storage system 10. Hook 40 is configured to attach to and detach from the plurality of spaced poles 26. In the embodiment shown in FIGS. 5 and 6, hook 40 is formed from a pair of spaced, elongated members 42A, 42B extending along a longitudinal axis 43, which extends in the same direction as the x-axis shown in FIGS. 5 and 6. Spaced elongated members 42, 42B, while extending along longitudinal direction 43, converge to form an apex portion 44 at one end of hook 40. Apex portion 44 is shown as a U-shaped structure but can easily be a different structure such as a V-shaped structure. As further shown in FIGS. 5 and 6, spaced elongated members 42A, 42B extending along longitudinal axis 43 terminate at first and second ends 48A, 48B. First and second ends 48A, 48B are located opposite from the apex portion 44 of hook 40 along longitudinal axis 43. As explained further below, first and second ends 48A, 48B are each configured to attach and detach from the plurality of poles 26 of the elastic anchoring device 20.

Hook 40 is preferably made from a resilient metal such as chrome-plated steel. The use of a resilient metal allows hook 40 to be compressible in the z-direction as shown in FIGS. 5 and 6, which allows hook 40 to be secured to elastic anchoring device 20. As further shown in FIGS. 5 and 6, hook 40 is formed from a small cylindrical metal bar (not labelled).

As further shown in FIGS. 5 and 6, apex portion 44 can extend at an angle away from the longitudinal direction 43 of the spaced, elongated members 42A, 42B. Referring back to FIG. 1, the arcuate orientation of apex portion 44 (not labelled in FIG. 1) provides a hard stop for an item looped around hook 40. One skilled in the art will appreciate that the extent apex portion 44 is angled in the y-direction is variable. The angle of apex portion 44 in the y-direction can be acute (i.e., less than) 90°, orthogonal (i.e.,) 90°, obtuse (i.e., greater than) 90°, or any angle in between. As shown in FIGS. 5 and 6, apex portion 44 extends in y-direction at an angle slightly less than orthogonal (i.e., substantially orthogonal).

In another embodiment, apex portion 44 can be non-angled and extend in the same plane as spaced, elongated members 42A, 42B. In this embodiment, items can be hung from hook 40 using carabiner or equivalent device rather than looped around hook 40.

Turning back to the embodiment shown in FIGS. 5 and 6, each of the spaced, elongated members 42A, 42B has an abutting portion 46A, 46B located distal (i.e., furthest) from the apex portion 44 and proximal (i.e., closest) to the first and second ends 48A, 48B. Abutting portion 46A, 46B are configured to abut (i.e., rest on) lower spaced elastic band 24 of elastic anchoring device 20 as shown in FIG. 1 after first and second ends 48A, 48B are attached to the plurality of poles 26. Abutting portions 46A, 46B extends at an angle away from the longitudinal direction of the spaced, elongated members 42A, 42B in the y-direction in a similar manner to apex portion 44 described above. In the shown embodiment, abutting portions 46A, 46B extends in the y-direction at an angle substantially orthogonal (i.e., about) 90° relative to the longitudinal direction 43 of the spaced, elongated members extending in the x-direction.

However, one skilled in the art will recognize that hook 40 can omit abutting portions 46A, 46B without altering the overall functionality of detachable storage system 10. In another embodiment, if apex portion 44 is not angled in the y-direction, the entirety of hook 40 will extend in the same plane from apex potion 44 to first and second ends 48A, 48B.

In order for hook 40 to connect to poles 26, first and second ends 48A, 48B each comprise an arcuate portion (i.e., have an arcuate end) configured to attach to and detach from the plurality of poles 26 of elastic anchoring device 20. In the shown embodiment, the arcuate portions (not labelled) of first and second ends 48A, 48B each comprise an L-shaped element (not labelled). Each L-shaped element has a major portion of extending along the longitudinal axis of the spaced, elongated members 42A, 42B in the x-direction. To provide the arcuate structure, each L-shaped element has a minor portion extending at an angle substantially orthogonal in the z-direction relative to the longitudinal axis 43 of the spaced, elongated members 42A, 42B. As further explained below, the arcuate structures of first and second ends 48A, 48B allow hook 40 to attach to and detach from plurality of poles 26 of elastic anchoring device 20.

Figure 7:
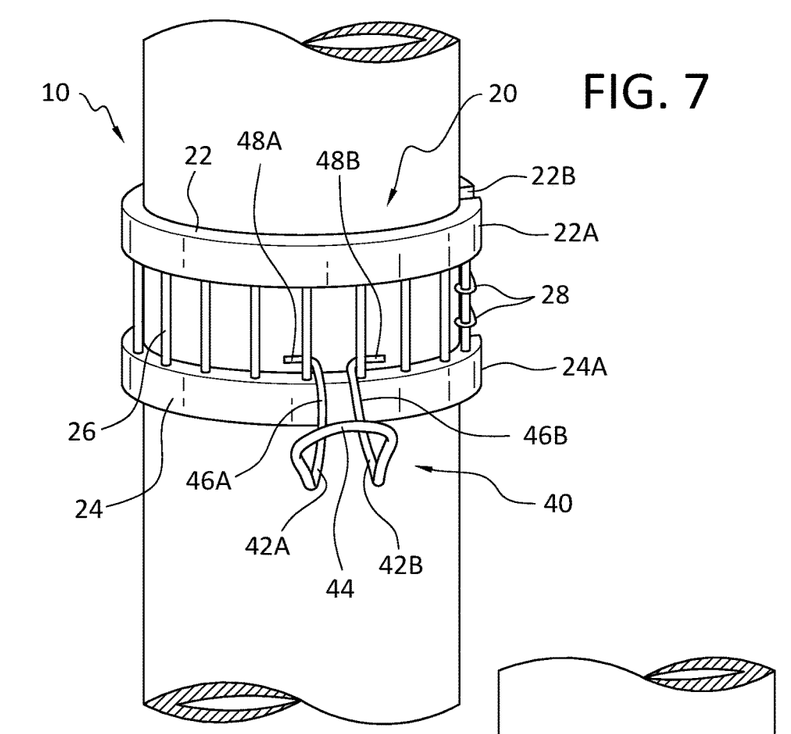
FIG. 7 is a front view of detachable hanging system 10 with an elastic anchoring device 20 and at least one hook 40 locked into elastic anchoring device 20.
Figure 8:
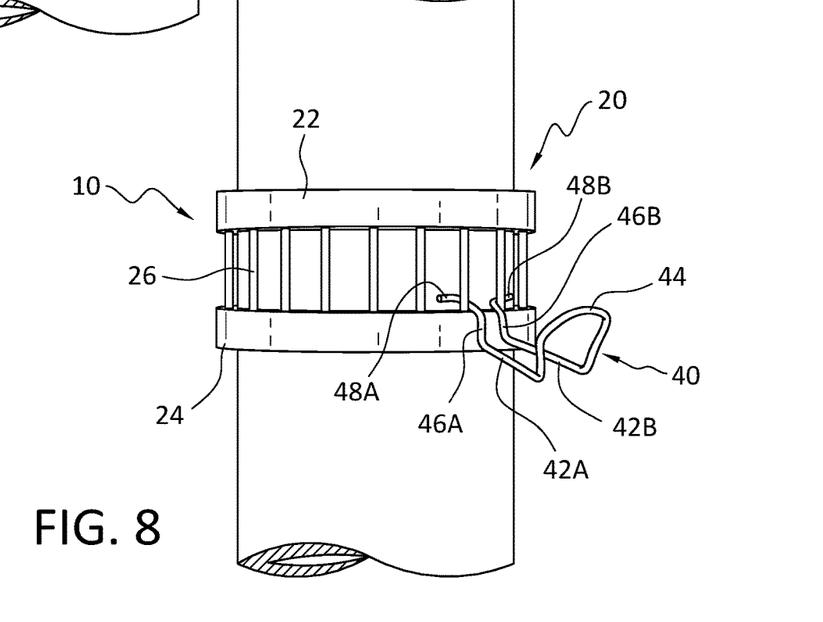
FIG. 8 is a perspective view of detachable hanging system 10 shown in FIG. 7.

FIGS. 7 and 8 show a front view and a perspective view, respectively, of hook 40 (as shown in FIGS. 5 and 6) installed on clastic anchoring device 20 to form detachable storage system 10 of the present invention. As previously described, elastic anchoring device 20 of the shown embodiment includes spaced clastic bands 22, 24 with plurality of poles 26 fixed to and extending between spaced elastic bands 22, 24. FIG. 7 further shows, on the right side of the figure, opposite first and second ends 22A, 22B of band 22 and opposite first and second ends 24A, 24B of band 24, respectively, facing each other after spaced elastic bands 22, 24 being stretched around the non-planar structure shown as a pole. As further shown in FIG. 7, tension is maintained on spaced elastic bands 22, 24 by use of connecting means 28. Both FIGS. 7 and 8 show hook 40 installed on elastic anchoring device 20. Hook 40 is installed, for example, by compressing a portion of hook 40 (e.g., the spaced, elongated member 42A, 42B) is the z-direction (as shown in FIGS. 5 and 6), which is orthogonal to the longitudinal direction 43 shown in FIGS. 5 and 6. Upon compression, first and second ends 48A, 48B with their arcuate structure are placed behind a pair of plurality of poles 26. After the compression forced is released, hook 40 rebounds and the arcuate structure of first and second ends 48A, 48B abut and are tensioned against the interior sides (not labelled) of the pair of the plurality of poles 26.

As further shown in FIGS. 7 and 8, once hook 40 is installed between a pair of poles 26, abutting portions 46A, 46B abut (i.e., rest against) the exterior surface (not labelled) of spaced, elastic band 24. As a result, abutting portions 46A, 46B help hook 40 to extend away from elastic anchoring device 20 and the non-planar structure at an angle as shown in FIG. 8. In the embodiment shown in FIG. 8, hook 40 extends at an angle slightly less than orthogonal (i.e., substantially orthogonal). However, as explained above, abutting portions 46A, 46B can be omitted resulting in hook 40 extending away from elastic anchoring device 20 in a greater acute angle.

The foregoing detailed description is to be understood as being in every respect illustrative and exemplary, but not restrictive, and the scope of the invention disclosed herein is not to be determined from the detailed description, but rather from the claims as interpreted according to the full breadth permitted by the patent laws. Those skilled in the art could implement various other feature combinations without departing from the scope and spirit of the invention. The claims are not limited by the preferred embodiments and examples but will cover many modifications and equivalents consistent with the written description as a whole.

What is claimed is:

1. A detachable storage system for hanging an object from a non-planar structure, the storage system comprising:
    an elastic anchoring device including (i) spaced elastic bands extending along a longitudinal axis, each of the spaced elastic bands having opposite first and second ends, (ii) a connecting means configured to tension the opposite first and second ends towards each other thereby securing the elastic anchoring device to the non-planar structure, and (iii) a plurality of spaced metal poles disposed in and extending between opposing inner sides of the spaced elastic bands; and
    at least one metal hook configured to attach to and detach from the plurality of spaced metal poles, the at least one metal hook providing a section for hanging the object from the non-planar structure.

2. The detachable storage system of claim 1, wherein the spaced elastic bands are substantially parallel extending along the longitudinal direction.

3. The detachable storage system of claim 1, wherein the plurality of spaced metal poles extend substantially orthogonal between the spaced elastic bands.

4. The detachable storage system of claim 1, wherein the spaced elastic bands comprise an elastomeric polymer.

5. The detachable storage system of claim 1, wherein the at least one metal hook comprises a pair of spaced, elongated members extending along a longitudinal axis, the spaced elongated members converging to form an apex portion at one end of the at least one metal hook and terminate at first and second ends opposite from the apex portion along the longitudinal axis, the first and second ends being configured to attach and detach from the plurality of spaced metal poles of the elastic anchoring device.

6. The detachable storage system of claim 5, wherein the apex portion extends at an angle away from the longitudinal direction of the spaced, elongated members.

7. The detachable storage system of claim 6, wherein the angle of the apex portion is substantially orthogonal relative to the longitudinal direction of the spaced, elongated members.

8. The detachable storage system of claim 5, wherein the apex portion is a U-shaped portion.

9. The detachable storage system of claim 5, wherein the first and second ends each comprise an arcuate portion configured to attach and detach from the plurality of spaced metal poles of the elastic anchoring device.

10. The detachable storage system of claim 9, wherein the arcuate portions of the first and second ends each comprise an L-shaped element.

11. The detachable storage system of claim 10, wherein a majority of each L-shaped element extends along the longitudinal axis of the spaced, elongated members, and a minority of each L-shaped element extends at an angle substantially orthogonal to the longitudinal axis of the spaced, elongated members.

12. The detachable storage system of claim 5, wherein each of the pair of spaced, elongated members has an abutting portion distal from the apex and proximal to the first and second ends, the abutting portion being configured to abut one of the spaced elastic bands after the first and second ends are attached to the plurality of spaced metal poles of the elastic anchoring device.

13. The detachable storage system of claim 12, wherein the abutting portion extends at an angle away from the longitudinal direction of the spaced, elongated members.

14. The detachable storage system of claim 13, wherein the angle of the abutting portion is substantially orthogonal relative to the longitudinal direction of the spaced, elongated members.

15. The detachable storage system of claim 1, wherein the connecting means comprises at least one metal arm having opposing ends, one of the opposing ends being configured to attach and detach from the plurality of spaced metal poles of the elastic anchoring device.

16. The detachable storage system of claim 15, wherein the at least one arm comprises a pair of metals arms with opposing ends.

17. The detachable storage system of claim 15, wherein the other end of the at least one arm is rotatably fixed to one of the plurality of spaced metal poles of the elastic anchoring device.

18. The detachable storage system of claim 15, where the opposing end configured to attach and detach from the plurality of spaced metal poles comprises an arcuate portion configured to hook one of the plurality of spaced metal poles.

19. The detachable storage system of claim 1, wherein the detachable storage system is configured to be non-destructive by not damaging the non-planar structure to which the detachable storage system is anchored.

\* \* \* \* \*